United States Patent
Buschhoff

[15] 3,671,561
[45] June 20, 1972

[54] METHOD OF MAKING HEXAORGANODIPLUMBANES

[72] Inventor: Max Buschhoff, Luenen, Germany
[73] Assignee: Schering AG, Berlin, Germany
[22] Filed: Dec. 31, 1969
[21] Appl. No.: 889,708

[30] Foreign Application Priority Data

Jan. 7, 1969   Germany.....................P 19 01 030.1

[52] U.S. Cl......................................260/437 R, 260/448 A
[51] Int. Cl. ..........................................................C07f 7/24
[58] Field of Search....................................................260/437

[56] References Cited

UNITED STATES PATENTS 2,859,231   11/1958   Blitzer et al........................260/437 R
2,955,124   10/1960   Blitzer et al........................260/437 R

OTHER PUBLICATIONS

Chemical Abstracts, Vol. 55, 15335g (1961)
Chemical Abstracts, Vol. 54, 9738a (1960)
Calingaert, J. Org. Chem. 2, 535 (1938) (QD–241–J6)
Pearson et al., Adv. in Chemistry Series, No. 23, Amer. Chem Soc., Wash., D.C., pp. 302–303 (1959) (QD–411–A5)

Primary Examiner—Tobias E. Levow
Assistant Examiner—H. M. S. Sneed
Attorney—Curtis, Morris & Safford

[57]           ABSTRACT

Method of making hexaorganodiplumbanes, $Pb_2R_6$, by reacting a lead carboxylate and an organoaluminum compound, $AlR_3$, where R is aliphatic or cycloaliphatic.

7 Claims, No Drawings

METHOD OF MAKING HEXAORGANODIPLUMBANES

METHOD OF MAKING HEXAORGANODIPLUMBANES

The present invention relates to methods of making hexaorganodiplumbanes.

Hexaorganodiplumbanes are organo-metallic compounds which, inter alia, are useful as precursors in the preparation of trialkyl lead salts. Such conversion reactions are taught, for example, in "Organolead Chemistry" by L. C. Willemsens, page 66, International Lead-Zinc Research Organization, 292 Madison Avenue, New York, New York 10017, (February 1964) and in "The Organic Compounds of Lead" by H. Shapiro and F. W. Frey, page 416 et seq., John Wiley & Sons, New York (1968).

It is known in the art to prepare organo lead compounds by the alkylation of lead salts (cf. L. C. Willemsens, op. cit.) Other metal alkyls are usually used as alkylating agents, especially those of metals of Groups I - III of the Periodic System. As lead salts, lead acylates ($Pb$ II and $Pb$ IV), as well as lead oxide and lead sulfide are used, in addition to the lead halides. In all these reactions, tetraalkyl lead compounds are obtained irrespective of the lead salt and alkylating agent employed. Thus, the reaction of lead chloride with Grignard reagents takes place according to the following reaction scheme:

$$2PbCl_2 + 4RMgCl \longrightarrow 2PbR_2 + 4MgCl_2$$
$$2PbR_2 \longrightarrow \tfrac{2}{3}Pb_2R_6 + \tfrac{2}{3}Pb$$
$$\tfrac{2}{3}Pb_2R_6 \longrightarrow PbR_4 + \tfrac{1}{3}Pb$$
$$\overline{2PbCl_2 + 4RMgCl \longrightarrow PbR_4 + Pb + 4MgCl_2}$$

It is possible to isolate hexaorganodiplumbanes in solution only if alkyl compounds of metals of Groups I and II of the Periodic System are used for alkylation, in particular lithium and magnesium-alkyls, and only when the reaction is carried out under carefully controlled conditions. Although this may be suitable in the laboratory, its use on a technical scale is unfeasibly difficult.

For large scale reactions, the easily obtainable alkyl compounds of metals of Group III of the Periodic System, which compounds are easy for the skilled chemist to handle, are particularly useful. But processes for making hexaorganodiplumbanes from lead salts and metal alkyls of this type have heretofore not been known. In such reactions, tetraalkyl lead compounds have always been obtained (cf. L. C. Willemsens, op. cit., and German Pat. No. 1,216,301).

According to the present invention, hexaorganodiplumbanes are prepared by reacting lead (II) or lead (IV) salts of organic acids, particularly salts of lower alkanoic acids such as the acetates, with compounds of aluminum of the general formula $AlR_3$, wherein R is aliphatic or cycloaliphatic, suitably a saturated or olefinically unsaturated aliphatic hydrocarbon having up to about 10 carbon atoms in a chain which may be straight or branched, or a cycloaliphatic hydrocarbon.

The lead salts employed are of the type $Pb(OCOR)_2$ or $Pb(OCOR)_4$, wherein R is an aryl radical or a saturated or unsaturated aliphatic or cycloaliphatic radical, suitably a hydrocarbon radical. Salts of lower alkanoic acids (e.g. $C_1 - C_4$ acids) are particularly preferred.

The lead salts are combined with the aluminum compounds, preferably while the latter are in solution. As solvents, toluene is preferably employed, but other aromatic and aliphatic hydrocarbons and chlorinated hydrocarbons can be used, as well as straight-chain and branched chain aliphatic, cyclic, and aromatic ethers, if they are inert, i.e. if they do not react with the alkylating agent. Suitable solvents include — but are not limited to — benzene, xylene, heptane, anisol, and methylene chloride.

The reaction temperature may be between about −70° C. and +40°C., but is preferably between about −5° C. and +5° C.

The reaction of the present invention is believed to take place according to the following scheme:

$$3Pb(OCOR')_2 + 6AlR_3 \longrightarrow 3PbR_2 + 6AlR_2(OCOR')$$
$$3PbR_2 \longrightarrow Pb_2R_6 + Pb$$
$$\overline{3Pb(OCOR')_2 + 6AlR_3 \longrightarrow Pb_2R_6 + Pb + 6AlR_2(OCOR')}$$

To isolate the hexaorganolead compound from the reaction mixture, the dialkylaluminum acylate formed is suitably converted into a product insoluble in the organic solvent phase. For example, the acylate can be decomposed by adding water, preferably ice-water, to precipitate aluminum hydroxide which is then physically separated from the organic phase by techniques such as filtration or centrifugation. Alternatively, the amphoteric precipitate which would otherwise form can be converted to water-soluble species by treatment with an acid or base at a pH outside the range of 3.5 to 13. Still further, the aluminum can be reacted with a complexing agent such as sodium potassium tartrate or sodium oxalate to form a water-soluble complex.

In a preferred embodiment, the reaction is carried out by adding an anhydrous lead acylate in a mol ratio of 1:2 to a solution of the aluminum compound in an inert organic solvent under a dry protective atmosphere such as of nitrogen or one of the rare gases. After addition is complete, it is advantageous to let the materials react for 1 - 2 hours at 40° C. Thereafter, the reaction mixture is added to a mixture of ice, concentrated hydrochloric acid and water to decompose the dialkylaluminum acylate and the content of hexaorganodiplumbane in the organic phase is determined iodometrically.

A better understanding of the present invention and of its many advantages will be had by referring to the following specific Examples given by way of illustration.

EXAMPLE 1

163 g. (0.5 mol) of finely-powdered anhydrous lead (II) acetate were added with stirring at −5° C. to a solution of 198 g (1 mol) of aluminum tributyl in 500 ml. of toluene. After addition was complete, the mixture was heated for 1 hour at 40° C. The reaction mixture was then carefully added to a mixture of 200 ml. concentrated hydrochloric acid, 200 ml. of water, and 500 g of ice to decompose the dibutylaluminum acetate formed by the reaction. The yellow toluene phase was separated and its content of hexabutyldiplumbane was determined iodometrically. The yield, calculated on the amount of lead acetate employed, was 80 – 85 percent.

Alternatively, aluminum hydroxide can be precipitated by the addition of ice and water alone, and then removed by filtration or centrifugation. Aqueous solutions of a base, such as sodium hydroxide or potassium hydroxide, at a pH greater than 13 can also be used to separate the desired hexabutyldiplumbane from aluminum compounds present in the reaction mixture.

Although the hexaorganodiplumbane products can be isolated by evaporation of the solvent, they are conveniently left in solution in the organic solvent phase.

EXAMPLES 2 - 8

In each Example, 1 mol of organoaluminum compound was reacted with 163 g (0.5 mol) of water-free lead (II) acetate in 500 ml. of toluene as described in Example 1.

| Example No. | R in $AlR_3$ | % Yield |
| --- | --- | --- |
| 2 | propyl | 70 |
| 3 | isobutyl | 60 |
| 4 | hexyl | 70 |
| 5 | isohexyl | 50 |
| 6 | octyl | 70 |
| 7 | 3,7-dimethyl-octene-6yl -1 | 80 |
| 8 | 4:1 isomeric mixture of 2-phenyl-ethyl-1 and 1-phenyl-ethyl-1 | 50 |

EXAMPLES 9 - 11

In each Example, 198 g (1 mol) of aluminum tributyl were reacted with 163 g (0.5 mol) of anhydrous lead (II) acetate as in Example 1 using 500 ml. of different inert solvents.

| Example No. | Solvent | % Yield |
|---|---|---|
| 9 | Benzene | 50 |
| 10 | Anisol | 60 |
| 11 | Methylene Chloride | 60 |

EXAMPLES 12 - 13

198 g (1 mol) of aluminum tributyl were reacted in each case with 0.5 mol of an anhydrous lead (II) acylate in 500 ml. of toluene, as in Example 1.

| Example No. | Lead (II) Acylate | % Yield |
|---|---|---|
| 12 | Lead propionate | 70 |
| 13 | Lead isobutyrate | 60 |

What is claimed is

1. The method of making an hexoorganodiplumbane of the formula $$Pb_2R_6,$$

wherein R is aliphatic hydrocarbon or cycloaliphatic hydrocarbon, which method comprises adding one molar part of a lead (II) carboxylate to two molar parts of an aluminum compound of the formula $$AlR_3,$$

where R has its earlier meaning, at a temperature from about $-70°$ C. to about $40°$ C.

2. The method as in claim 1 wherein said lead carboxylate and aluminum compound are reacted at a temperature from about $-5°$ C. to $+5°$ C.

3. The method as in claim 1 wherein said lead carboxylate is a lead (II) compound.

4. The method as in claim 1 wherein said lead carboxylate is a salt of a lower alkanoic acid.

5. The method as in claim 1 wherein said lead carboxylate and aluminum compound are reacted in an organic solvent inert to the reaction.

6. The method as in claim 5 wherein said inert solvent is an aliphatic or aromatic hydrocarbon or chlorinated hydrocarbon or an ether.

7. The method as in claim 1 wherein the hexaorganodiplumbane reaction product is isolated by converting aluminum compounds formed by the reaction into compounds insoluble in an organic solvent phase.

* * * * *